US008316239B2

(12) United States Patent
McKinley et al.

(10) Patent No.: US 8,316,239 B2
(45) Date of Patent: *Nov. 20, 2012

(54) DECODING INFORMATION TO ALLOW ACCESS TO COMPUTERIZED SYSTEMS

(75) Inventors: Tyler J. McKinley, West Linn, OR (US); Ravi K. Sharma, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 339 days.

This patent is subject to a terminal disclaimer.

(21) Appl. No.: 12/401,394

(22) Filed: Mar. 10, 2009

(65) Prior Publication Data

US 2010/0009714 A1 Jan. 14, 2010

Related U.S. Application Data

(63) Continuation of application No. 10/382,359, filed on Mar. 4, 2003, now Pat. No. 7,502,937, and a continuation-in-part of application No. 10/275,197, filed as application No. PCT/US01/14014 on Apr. 30, 2001.

(60) Provisional application No. 60/361,749, filed on Mar. 4, 2003.

(51) Int. Cl.
*H04K 1/00* (2006.01)

(52) U.S. Cl. .................. 713/186; 713/185; 713/182

(58) Field of Classification Search .................. 713/186, 713/185, 182
See application file for complete search history.

(56) References Cited

U.S. PATENT DOCUMENTS

| 4,590,366 A | 5/1986 | Rothfjell |
| 4,675,746 A | 6/1987 | Tetrick et al. |
| 4,689,477 A | 8/1987 | Goldman |
| 4,728,984 A | 3/1988 | Daniele |
| 4,807,031 A | 2/1989 | Broughton et al. |
| 4,972,476 A | 11/1990 | Nathans |
| 5,018,767 A | 5/1991 | Wicker |
| 5,091,966 A | 2/1992 | Bloomberg et al. |
| 5,221,833 A | 6/1993 | Hecht |

(Continued)

FOREIGN PATENT DOCUMENTS

DE    29 43 436    5/1981

(Continued)

OTHER PUBLICATIONS

A New Low Cost One Time ID and Password Authentication Protocol Using Popular Removable Storage Devices; Li TongLiang ; Jin ZhiGang ; Sch. of Comput. Sci. & Technol., Tianjin Univ., Tianjin, China; Intelligent Networks and Intelligent Systems, 2009. ICINIS '09. Second International Conference on; Issue Date : Nov. 1-3, 2009; On pp. 213-216.*

(Continued)

*Primary Examiner* — David Y Jung

(57) ABSTRACT

The presently claimed invention relates generally to gaining access to secure systems. One claim recites an apparatus including: an image or video sensor for capturing image or video data; and a multi-purpose computer processor configured to: decode machine-readable information encoded in captured image or video data representing a plurality of physical objects, each instance of machine-readable information includes identifying information; determine an order in which the physical objects are presented to the image or video sensor for evaluation via the identifying information; and comparing the order to a predetermined sequence to determine whether to allow access to a remotely located computerized system. The apparatus may be housed, e.g., in a cell phone. Other combinations and claims are provided as well.

18 Claims, 4 Drawing Sheets

U.S. PATENT DOCUMENTS

| | | | |
|---|---|---|---|
| 5,237,164 A | 8/1993 | Takada | |
| 5,284,364 A | 2/1994 | Jain | |
| 5,319,453 A | 6/1994 | Copriviza et al. | |
| 5,329,108 A | 7/1994 | Lamoure | |
| 5,337,361 A | 8/1994 | Wang et al. | |
| 5,379,345 A | 1/1995 | Greenberg | |
| 5,384,846 A | 1/1995 | Berson et al. | |
| 5,436,970 A | 7/1995 | Ray et al. | |
| 5,449,896 A | 9/1995 | Hecht et al. | |
| 5,471,533 A | 11/1995 | Wang et al. | |
| 5,495,581 A | 2/1996 | Tsai | |
| 5,515,451 A | 5/1996 | Tsuji et al. | |
| 5,629,770 A | 5/1997 | Brassil et al. | |
| 5,636,292 A | 6/1997 | Rhoads | |
| 5,646,997 A | 7/1997 | Barton | |
| 5,652,626 A | 7/1997 | Kawakami et al. | |
| 5,659,726 A | 8/1997 | Sandford, II et al. | |
| 5,694,471 A | 12/1997 | Chen et al. | |
| 5,721,788 A | 2/1998 | Powell et al. | |
| 5,740,244 A | 4/1998 | Indeck et al. | |
| 5,768,426 A | 6/1998 | Rhoads | |
| 5,787,186 A | 7/1998 | Schroeder | |
| 5,799,092 A | 8/1998 | Kristol et al. | |
| 5,810,666 A | 9/1998 | Mero et al. | |
| 5,835,639 A | 11/1998 | Honsinger et al. | |
| 5,841,886 A | 11/1998 | Rhoads | |
| 5,845,008 A | 12/1998 | Katoh et al. | |
| 5,859,920 A | 1/1999 | Daly et al. | |
| 5,862,260 A | 1/1999 | Rhoads | |
| 5,864,622 A | 1/1999 | Marcus | |
| 5,864,623 A | 1/1999 | Messina et al. | |
| 5,907,149 A | 5/1999 | Marckini | |
| 5,912,974 A | 6/1999 | Holloway et al. | |
| 5,933,086 A | 8/1999 | Tischendorf et al. | |
| 5,949,055 A | 9/1999 | Fleet et al. | |
| 6,024,287 A | 2/2000 | Takai et al. | |
| 6,031,914 A | 2/2000 | Tewfik et al. | |
| 6,076,738 A | 6/2000 | Bloomberg et al. | |
| 6,148,091 A | 11/2000 | DiMaria | |
| 6,256,737 B1* | 7/2001 | Bianco et al. | 713/186 |
| 6,263,087 B1 | 7/2001 | Miller | |
| 6,289,108 B1 | 9/2001 | Rhoads | |
| 6,292,092 B1 | 9/2001 | Chow et al. | |
| 6,314,192 B1 | 11/2001 | Chen et al. | |
| 6,343,138 B1 | 1/2002 | Rhoads | |
| 6,345,104 B1 | 2/2002 | Rhoads | |
| 6,408,330 B1 | 6/2002 | DeLaHuerga | |
| 6,417,663 B1 | 7/2002 | Piernot et al. | |
| 6,424,725 B1 | 7/2002 | Rhoads et al. | |
| 6,449,377 B1 | 9/2002 | Rhoads | |
| 6,463,416 B1 | 10/2002 | Messina | |
| 6,496,595 B1 | 12/2002 | Puchek et al. | |
| 6,522,770 B1 | 2/2003 | Seder et al. | |
| 6,546,112 B1 | 4/2003 | Rhoads | |
| 6,574,350 B1 | 6/2003 | Rhoads et al. | |
| 6,607,127 B2* | 8/2003 | Wong | 235/451 |
| 6,614,914 B1 | 9/2003 | Rhoads et al. | |
| 6,636,615 B1 | 10/2003 | Rhoads et al. | |
| 6,651,168 B1* | 11/2003 | Kao et al. | 713/185 |
| 6,674,886 B2 | 1/2004 | Davis et al. | |
| 6,675,165 B1 | 1/2004 | Rothschild | |
| 6,683,966 B1 | 1/2004 | Tian | |
| 6,694,041 B1 | 2/2004 | Brunk | |
| 6,714,683 B1 | 3/2004 | Tian | |
| 6,721,440 B2 | 4/2004 | Reed et al. | |
| 6,724,912 B1 | 4/2004 | Rhoads | |
| 6,727,996 B1 | 4/2004 | Silverbrook et al. | |
| 6,735,324 B1 | 5/2004 | Mckinley et al. | |
| 6,735,695 B1 | 5/2004 | Gopalakrishnan et al. | |
| 6,751,336 B2 | 6/2004 | Zhao et al. | |
| 6,766,040 B1 | 7/2004 | Catalano et al. | |
| 6,782,116 B1 | 8/2004 | Zhao et al. | |
| 6,788,800 B1 | 9/2004 | Carr et al. | |
| 6,830,196 B1 | 12/2004 | Silverbrook et al. | |
| 6,832,730 B2* | 12/2004 | Conner et al. | 235/487 |
| 6,845,453 B2* | 1/2005 | Scheidt et al. | 726/5 |
| 6,866,195 B2 | 3/2005 | Knowles | |
| 6,871,789 B2 | 3/2005 | Hilton et al. | |
| 6,947,571 B1 | 9/2005 | Rhoads et al. | |
| 6,965,873 B1 | 11/2005 | Rhoads | |
| 7,027,612 B2 | 4/2006 | Patterson et al. | |
| 7,043,052 B2 | 5/2006 | Rhoads | |
| 7,050,603 B2 | 5/2006 | Rhoads et al. | |
| 7,058,697 B2 | 6/2006 | Rhoads | |
| 7,072,490 B2 | 7/2006 | Stach | |
| 7,080,041 B2 | 7/2006 | Nagel | |
| 7,099,019 B2 | 8/2006 | Silverbrook et al. | |
| 7,111,168 B2 | 9/2006 | Lofgren et al. | |
| 7,116,781 B2 | 10/2006 | Rhoads | |
| 7,178,025 B2* | 2/2007 | Scheidt et al. | 713/168 |
| 7,181,042 B2 | 2/2007 | Tian | |
| 7,191,156 B1 | 3/2007 | Seder | |
| 7,239,734 B2 | 7/2007 | Alattar et al. | |
| 7,412,072 B2 | 8/2008 | Sharma et al. | |
| 7,502,937 B2 | 3/2009 | McKinley et al. | |
| 7,778,442 B2 | 8/2010 | Sharma et al. | |
| 2001/0023421 A1 | 9/2001 | Numano et al. | |
| 2001/0025342 A1 | 9/2001 | Uchida | |
| 2001/0026377 A1 | 10/2001 | Ikegami | |
| 2002/0126872 A1 | 9/2002 | Brunk et al. | |
| 2002/0126889 A1 | 9/2002 | Pikler et al. | |
| 2002/0170966 A1 | 11/2002 | Hannigan et al. | |
| 2003/0026421 A1 | 2/2003 | Morlet | |
| 2003/0026453 A1 | 2/2003 | Bradley et al. | |
| 2003/0052768 A1 | 3/2003 | Maune | |
| 2004/0036574 A1 | 2/2004 | Bostrom | |
| 2004/0128512 A1 | 7/2004 | Sharma et al. | |
| 2005/0013462 A1 | 1/2005 | Rhoads | |
| 2005/0047593 A1* | 3/2005 | Hampp | |
| 2005/0055571 A1* | 3/2005 | Woodson | 713/201 |
| 2005/0262350 A1 | 11/2005 | Boutant et al. | |
| 2005/0271246 A1 | 12/2005 | Sharma et al. | |
| 2007/0027818 A1 | 2/2007 | Lofgren et al. | |
| 2008/0215636 A1 | 9/2008 | Lofgren et al. | |
| 2009/0013414 A1* | 1/2009 | Washington et al. | 726/32 |
| 2009/0110059 A1* | 4/2009 | Rzeszewski et al. | 713/176 |
| 2010/0009714 A1 | 1/2010 | Sharma et al. | |
| 2010/0071031 A1* | 3/2010 | Carter | |

FOREIGN PATENT DOCUMENTS

| | | |
|---|---|---|
| EP | 493 091 | 12/1991 |
| EP | 629972 A2 | 12/1994 |
| EP | 0736860 A2 | 10/1996 |
| EP | 0642060 B1 | 4/1999 |
| JP | 3-185585 | 8/1991 |
| WO | WO 9603286 | 2/1996 |
| WO | WO01/84438 | 11/2001 |
| WO | WO 01/84438 | 11/2001 |
| WO | WO03/005291 | 1/2003 |
| WO | WO 03/005291 | 1/2003 |

OTHER PUBLICATIONS

Oracle8i Administrator's Guide Release 2 (8.1.6) Part No. A76956-01, Chapter 22, Managing Users and Resources, year 2000.*

Hologram Watermarks for Document Authentications Jana Dittmann, Lucilla Croce Ferri, Claus Vielhauer, IEEE, year 2001.*

10/137,124 May 1, 2002 Brett T. Hannigan et al.

Solitaire® Electronic Access Control Systems: Access Control with a Magnetic Card (Product Catalog), 59 pages, 2004.

Szepanski, "A Signal Theoretic Method for Creating Forgery-Proof Documents for Automatic Verification", 1979 Carnahan Conference on Crime Countermeasures, University of Kentucky, Lexington, Kentucky, May 16-18, 1979.

Kawaguchi et al., "Principle and Applications of BPCS-Steganography," Proc. SPIE vol. 3528: Multimedia Systems and Applications, Nov. 2-4, 1998, pp. 464-473.

Brassil et al., "Electronic Marking and Identification Techniques to Discourage Document Copying", Proceedings of INFOCOM '94 Conference on Computer, IEEE Commun. Soc Conference, Jun. 12-16, 1994, pp. 1278-1287.

Kawaguchi et al., "Principles and Applications of BPCS-Steganography," Proc. SPIE vol. 3528: Multimedia Systems and Applications, Nov. 2-4, 1998, pp. 464-473.

Komatsu et al., "A Proposal on Digital Watermarking in Document Image Communication and Its Application to Realizing a Signature," Electronics and Communications in Japan, Part I, vol., 73, No. 5, 1990, pp. 22-23.

Komatsu et al., "Authentication System Using Concealed Image in Telematics," Memoirs of the School of Science & Engineering, Waseda Univ., No. 52, 1988, pp. 45-60.

Bender et al., "Techniques for Data Hiding," SPIE vol. 2420, Jan. 1995, pp. 164-173.

Zhao, et al., "Embedding Robust Labels into Images for Copyright Protection," Proc. Of the Intern. Congress on Intel. Prop. Rights for Specialized Information, Knowledge and New Technologies (Vienna, Austria, Aug. 21-25, 1995).

Koch et al., "Copyright Protection for Multimedia Data," Dec. 1994.

Burgett, et al., "A Novel Method for Copyright Labeling Digitized Image Data," Sep. 7, 1994.

Dittmann, et al., "Hologram watermarks for document authentications," Information Tech: Coding and Computing, 2001, Proceedings International Conference on Apr. 2-4, 2001, pp. 60-64.

Bender et al., "Applications for Data Hiding," IBM Systems Journal, vol. 39, Nos. 384, 2000.

Gruhl et al., "Information Hiding to Foil the Casual Counterfeiter," Data Hiding Workshop, Apr. 15, 1998, 15 pages.

O'Ruanaidh et al., "Rotation, Scale and Translation Invariant Digital Image Watermarking," Int. Conf. on Image Proc., Oct. 1997, IEEE, pp. 536-539.

Quisquater et al., "Access Control and Copyright Protection for images, Conditional Access and Copyright Protection Based on the Use of Trusted Third Parties," 1995, 43 pages.

Sheng et al., "Experiments on Pattern Recognition Using Invariant Fourier-Mellin Descriptors," Journal of Optical Society of America, vol. 3, No. 6, Jun. 1986, pp. 771-776.

May 19, 2010 Amendment; Feb. 19, 2010 non-final Office Action; Nov. 12, 2009 Amendment; May 12, 2009 non-final Office Action; Apr. 24, 2009 Amendment Accompanying RCE; Nov. 25, 2008 final Office Action; Jul. 24, 2008 Amendment; Mar. 27, 2008 non-final Office Action; all from assignee's U.S. Appl. No. 10/275,197 (published as US 2004-0128512 A1).

PCT International Preliminary Examination Report for PCT/US01/14014, dated May 14, 2003.

* cited by examiner

DECODING INFORMATION TO ALLOW ACCESS TO COMPUTERIZED SYSTEMS

RELATED APPLICATION DATA

This application is a continuation of U.S. patent application Ser. No. 10/382,359, filed Mar. 4, 2003 (U.S. Pat. No. 7,502,937), which claims the benefit of U.S. Provisional Patent Application No. 60/361,749, filed Mar. 4, 2002. The Ser. No. 10/382,359 application is a continuation-in-part of U.S. patent application Ser. No. 10/275,197, filed Oct. 30, 2002 (published as US 2004-0128512 A1), which is the National Stage of International Application No. PCT/US01/14014 (published as WO 01/84438), filed Apr. 30, 2001. This application is also related to the following U.S. patent application Ser. No. 09/790,322 (U.S. Pat. No. 7,111,168), Ser. No. 09/562,049 (U.S. Pat. No. 7,191,156), Ser. No. 09/343,104 (now abandoned), Ser. No. 09/503,881 (U.S. Pat. No. 6,614,914), Ser. No. 09/562,516 (now abandoned), Ser. No. 09/562,524 (U.S. Pat. No. 6,724,912), Ser. No. 09/571,422 (U.S. Pat. No. 6,947,571), Ser. No. 09/636,102 (now abandoned), and is also related to U.S. Pat. Nos. 5,862,260, 6,345,104, 6,449,377 and 6,522,770. Each of the above patent documents is hereby incorporated herein reference.

FIELD OF THE INVENTION

The present disclosure relates to security systems and methods, and is particularly illustrated with reference to digital watermark-based security systems.

BACKGROUND AND SUMMARY OF THE INVENTION

Digital watermarking technology, a form of steganography, encompasses a great variety of techniques by which plural bits of digital data are hidden in some other object, preferably without leaving human-apparent evidence of alteration.

Digital watermarking systems typically have two primary components: an embedding component that embeds the watermark in the media content, and a reading component that detects and reads the embedded watermark. The embedding component embeds a watermark pattern by altering data samples of the media content. Many suitable techniques are detailed in the above-cited patent documents. In the present disclosure, however, it should be understood that references to watermarking encompass not only the assignee's watermarking technology, but can likewise be practiced with any other watermarking technology. The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface micro-topology of a medium, localized chemical changes (e.g. in photographic emulsions), localized variations in optical density, localized changes in luminescence, etc. The reading component analyzes content to detect whether a watermark pattern is present. In applications where the watermark encodes information, the reading component extracts this information from the detected watermark.

One aspect of the present disclosure is a security system based on digital watermarks. A digital watermark preferably includes a key or access information. The security system analyzes the access information to regulate access or to determine whether to allow access to a computer or secure area.

One claim recites a method comprising: employing a multi-purpose computer processor programmed for: decoding machine-readable information encoded in each of a plurality of physical objects, each instance of machine-readable information including identifying information; determining an order in which the encoded physical objects are presented for evaluation via the identifying information; and comparing the order to a predetermined sequence to determine whether to allow access to a computerized system.

Another claim recites an apparatus comprising: an image or video sensor for capturing image or video data; a multi-purpose computer processor programmed for: decoding machine-readable information encoded in captured image or video data representing a plurality of physical objects, each instance of machine-readable information includes identifying information; determining an order in which the physical objects are presented to the image or video sensor for evaluation via the identifying information; and comparing the order to a predetermined sequence to determine whether to allow access to a computerized system. Other claims and combinations are provided as well.

The foregoing and other features, aspects and advantages of the present invention will be even more readily apparent from the following detailed description, which proceeds with reference to the accompanying drawings.

DETAILED DESCRIPTION

Figure 1:
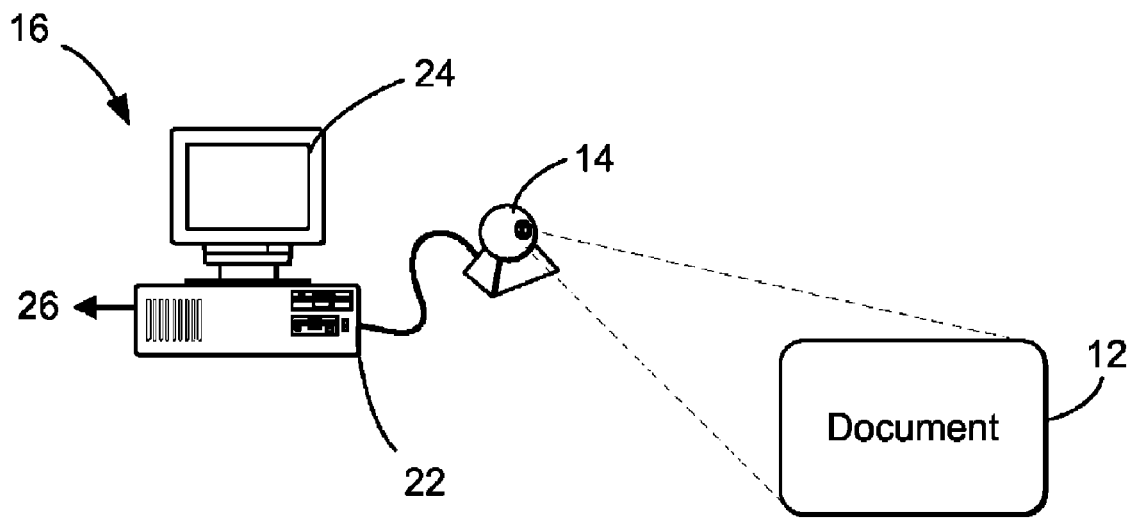
FIG. 1 illustrates a computer system according to an illustrative embodiment of the present invention.

In accordance with a first embodiment of the present invention, a document 12 includes plural-bit data steganographically encoded thereon (e.g., via digital watermarking). The document 12 can be a photo ID (e.g., a driver's license, student ID, identification document, employee badge, passport, etc.), a value document (e.g., a banknote, stock certificate, or other financial instrument), a credit card, a product manual, bank or credit account card, registration card, an image, a printed document, badge, a photograph, a graphic, or virtually any other type of document or physical object.

The encoding of the document 12 can encompass artwork or printing on the document, the document's background, background pattern or tint, a laminate layer applied to the document, surface texture, pixel or luminance variation, graphic, etc. If a photograph is present, it too can be encoded. A variety of watermark encoding techniques are detailed in the above cited patents and applications; artisans in the field know many more.

The encoded document 12 is presented to an input device 14 for image capture. The input device 14 can include a digital camera, digital camera, web camera, flatbed scanner, a hand scanner (including an imaging mouse), a video camera, CCD array, etc., etc. Input device 14 communicates with computer 16.

Computer 16 can be a general purpose or dedicated computer, including electronic processing circuitry (e.g., a CPU)

18, memory 20, a communication interface 22 (e.g., communications port and/or a device driver stored in memory 20, etc.) with the input device 14, a monitor or other output device (e.g., printer, etc.) 24, and optionally a network connection (e.g., communications hardware and/or software) 26. The network connection 26 can be used to connect, e.g., through an intranet, Ethernet, wireless network, internet, or otherwise, to a remote computer (not shown in FIG. 1). The electronic processing circuitry 18 and memory 20 are shown in FIG. 2. A system communications bus (not shown) helps facilitate communication between the various components.

Suitable software programming instructions, stored in memory 20 for execution by the electronic processing circuitry 18, can be used to effect various types of functionality for the present embodiment.

One such functionality detects and decodes digital watermarks. Another functionality provides security for network or computer access. Yet another functionality provides document verification for authorized access to a secure area or network location.

Figure 2:
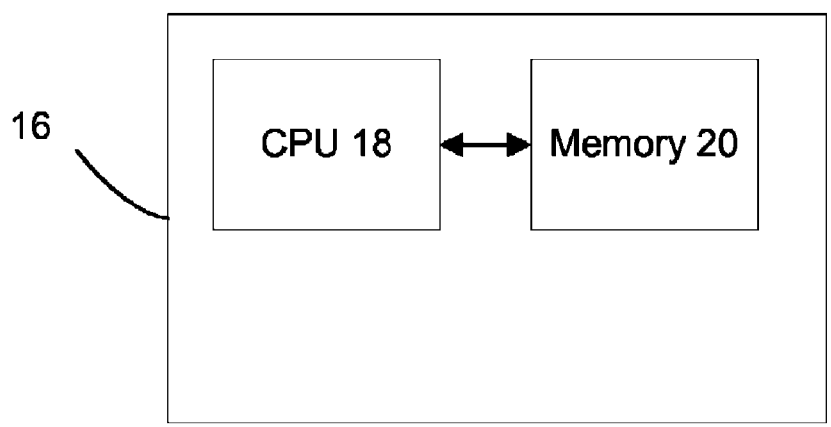
FIG. 2 illustrates a few components of the FIG. 1 system.

It should be appreciated that while the FIG. 1 computer system 16 is illustrated as a desktop system, the present invention is not so limited. Indeed, the computer system 16 can include a handheld device, a security system, a mobile computer (e.g., cell phone, onboard computer, etc.) or a distributed system. Similarly, the input device 14 need not be tethered to computer 16. Instead, input device 14 can be integrated with computer 16 and/or can wirelessly or remotely communicate with computer 16.

We initially note that the mere process of giving somebody a security token—be it an identification document, USB token, proximity card, their fingerprint, etc—weakens the security of the system. We believe that using digital watermarks is inherently a more secure method for secure access because digital watermarks can be covert and they can hide in any document.

Now consider our security enhancements using the FIG. 1 system as an example environment. A document (e.g., document 12) is steganographically encoded to include a payload having access information. The term "access information" is broadly used in this patent document and generally refers to information, which can be used to access, or to determine whether access should be granted, a secure location. A secure location may refer to a physical area, a network resource, a computer file or folder, a software application or computing device, etc. Access information may provide a key, code and/or data to allow or determine whether to allow such access. Access information may be carried by a steganographic payload (e.g., a digital watermark payload) or can be stored in a data record and accessed with an identifier, e.g., carried by a steganographic payload. Sometimes access information may include a decryption key, and access is allowed when the decryption key is used to successfully decrypt predetermined information. Or access information may including information which can be compared to information or samples provided by a user or information retrieved using the access information.

In one implementation, a steganographically encoded document 12 is preferably covert, in that a causal visual examination of the document 12 generally does not reveal the steganographic data. As such, document 12 can be placed in a stack of documents (or if an image, hung on the wall or placed in a frame on a desk). Thus, a would-be-intruder is clueless as to which document, if any, includes the access information.

Now consider, for example, a new employee's first day at a secure facility. As she begins her day she is provided with a digitally watermarked document (e.g., an ID badge or pass) to allow access into the secure facility or to her computer. The watermark includes a payload having access information. In one implementation, the access information is associated with the employee's employee number or with the employee's personal information. (For example, the access information may include a hash of the employee's name, birth date, employment start date, favorite XBox® title or movie, etc. Or the access information may include a hash of the employee's biometric information. The biometric information can be a facial scan/print, fingerprint, retinal identifier, voice sample, DNA representation, etc., etc. For more information on hashing techniques, see e.g., assignee's U.S. patent application Ser. No. 10/027,783, filed Dec. 19, 2001 (published as US 2002-0126872 A1), and U.S. patent application Ser. No. 10/094,593, filed Mar. 6, 2002 (published as US 2002-0170966A1). Each of these published U.S. Patent documents is herein incorporated by reference.). In another implementation, the access information is selected to match a particular security algorithm for a computer workstation or door access.

The employee presents the encoded document 12 to input device 14. Input device 14 captures an image of document 12 and communicates such to computer 16. Steganographic decoding software stored in memory 20 and executed by CPU 18 searches the captured image of document 12 for steganographic encoding, such as a digital watermark. Once found, the digital watermark is decoded to recover the digital watermark payload, e.g., including access information. The access information is then provided to a security software module. (Of course the digital watermark detection software and the security software can be integrated, or can be separate software modules. In some implementations the modules are implemented via hardware.).

The security software module uses the payload' access information to determine whether to allow access. For example, the access information may include a code (e.g., a numeric or alpha-numeric code). If the code matches or otherwise coincides with a predetermined code, access is granted. In one implementation, the code is a cryptographic permutation of the predetermined code. The predetermined code can be stored locally in computer 16 or can be retrieved from a central database. The predetermined code can be user specific, for example, the code can be unique per employee. (A random generator can be used to generate a random code, which is embedded as the payload. The random code is stored in an employee security database record to be indexed with the employee number. In this case, the digital watermark includes the employee's employee number or other identifier. Alternatively, the employee is prompted to enter her employee number, which is used to index the database.). In still another implementation, the employee must provide other access information (e.g., birth date, favorite movie title, etc.), which is then compared to the access information stored on the document.

If the access information includes a biometric hash, the user is prompted to provide a biometric sample. For example, if the hash includes retinal scan data, computer 16 preferably includes or communicates with a retinal scanner. The same (or complimentary) hashing algorithm is preformed on the retinal scan sample to produce a hash (i.e., a "sampled hash"). The payload is decoded from the embedded document 12 to retrieve the payload hash. The payload hash is compare with the sampled hash to verify authenticity. If authentic, access is allowed.

Figure 3:
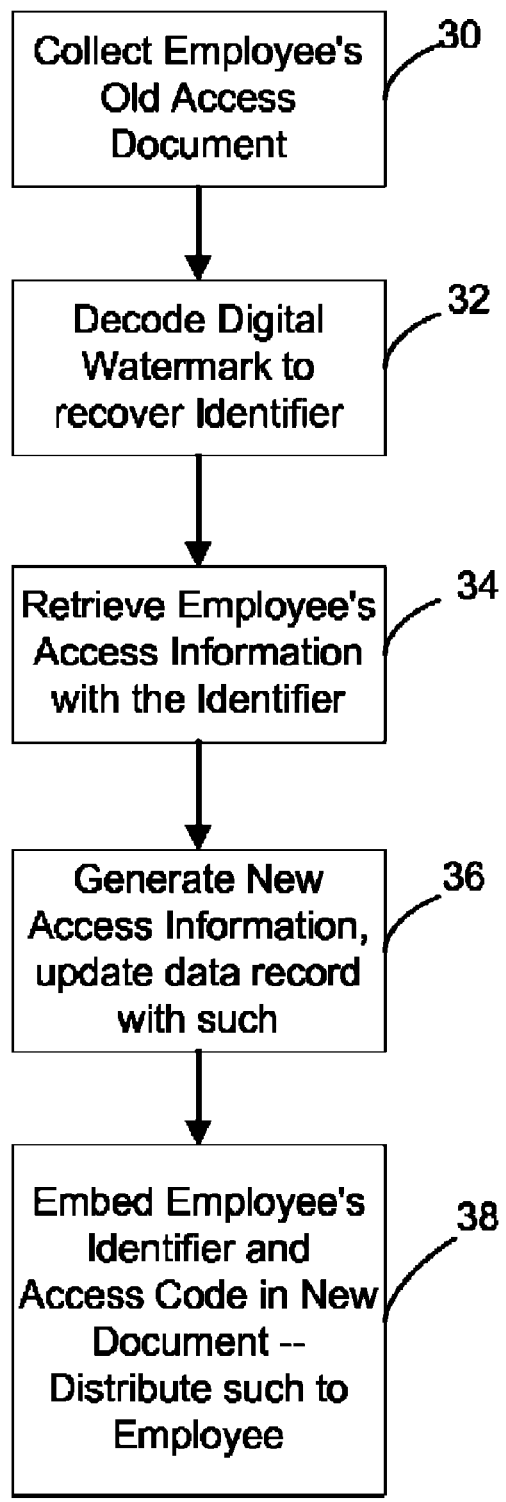
FIG. 3 is a flow diagram illustrating one implementation of a security method.

An employee document 12 can be frequently changed or replaced, e.g., every day (or every week, every time the employee leaves a secure facility, etc.). Consider an inventive security method with reference to FIG. 3. At the end of each day, an employee surrenders her watermarked document 12 (step 30) (In one implementation, surrendering the document 12 unlocks or otherwise opens an exit or door, allowing the employee to leave the premises. In this implementation, the digitally watermarked document 12 must be successfully decoded and verified prior to enabling the exit door.). In a central system, where a watermark detector communicates with a central (or local) database, the watermarked document will typically include an employee identifier (e.g., employee number) and steganographically embedded access information. The embedded access information is compared to the database information to determine whether to allow access.

The identifier is decoded from the watermark (step 32). The identifier is used to interrogate the database to retrieve the employee's security watermark access information (step 34). As an optional step, the retrieved access information can be compared with the decode access information to further verify the collected document 12. New watermark access information (e.g., a new code) is generated (step 36). In some cases the new access information mirrors the old access information. More preferably, however, is to provide entirely new access information. This new access information is used to update the employee's security watermark access information in the database. A new document 12' is provided to the employee (step 38). The new document 12' includes a steganographic payload with the new access information.

To further obscure the security process new document 12' is preferably a new (or different type of) document, or differently sized document, perhaps even on a different substrate, etc. (For example, if document 12 is a traditional employee badge, new document 12' can be a family photograph, graphic or digitally watermarked Word or Excel document. The new document 12' is used the next day (or next facility entry) for building entry, workstation access, etc. The old watermarked document 12' is preferably destroyed and the corresponding old digital watermarked payload (and code) is deleted from or marked as inactive in the database.

One strength of our inventive system is the fact that outsiders do not know that document 12 or 12' is an access token. This strength becomes evident, for example, when the digital watermark is embedded in a family picture, graphic or arbitrary Word/Excel document. Further, since documents are everywhere—it is extremely difficult for a would-be-thief to know which document is the access token even IF they know such documents are used as tokens. Not knowing what document is even used, or even that documents are used as the security token enables the security method to remain secret.

In another biometric-based implementation, a steganographic payload (e.g., a digital watermark payload) designates a specific "type" of biometric data for sampling. One type of biometric data is a fingerprint, another type is behavioral characteristics—including signatures, handwriting and voice patterns, still another type is a retinal scan, other types include face maps, DNA samples, blood type, hand geometry, handwriting, iris, vein patterns, and so on. In one example of this implementation, a biometric type is randomly chosen (or otherwise chosen). A corresponding biometric sample is taken from a human subject (e.g., employee). The biometric sample is hashed (or a reduced bit representation of the sample is produced), and the hash is steganographically encoded in a document. The document also includes biometric "type" data to indicate which type of biometric data that the hash represents. To verify authenticity, the encoded document is decoded to retrieve the hash and a biometric "type" data. The employee yields a fresh biometric sample of the type indicated by the steganographic type data. A corresponding hashing algorithm is preformed on the fresh biometric sample, and is then compared with the decoded biometric hash.

Figure 4:
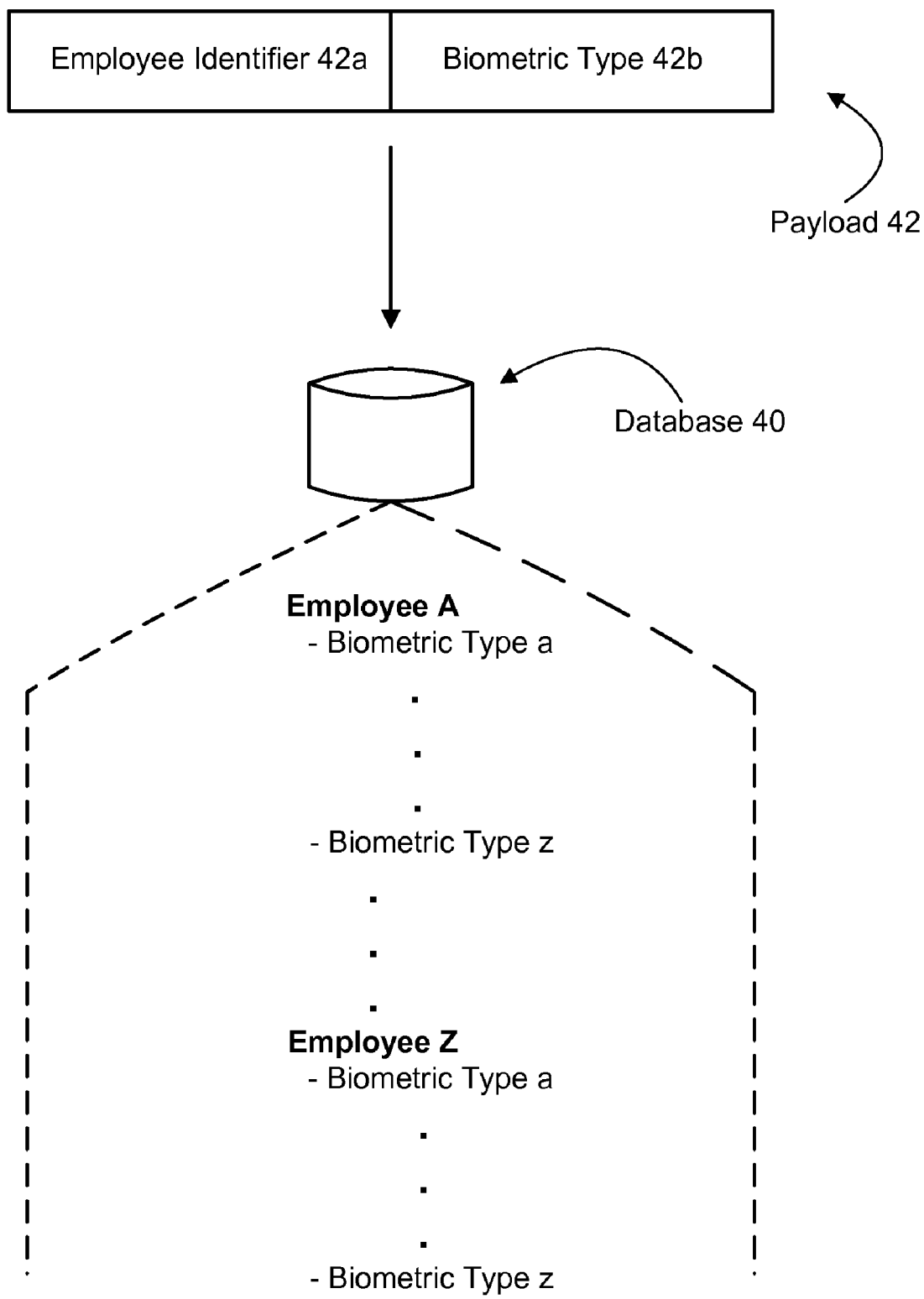
FIG. 4 is a diagram illustrating steganographic encoding including a multi-payload, and a database structure.
Figure 5A:
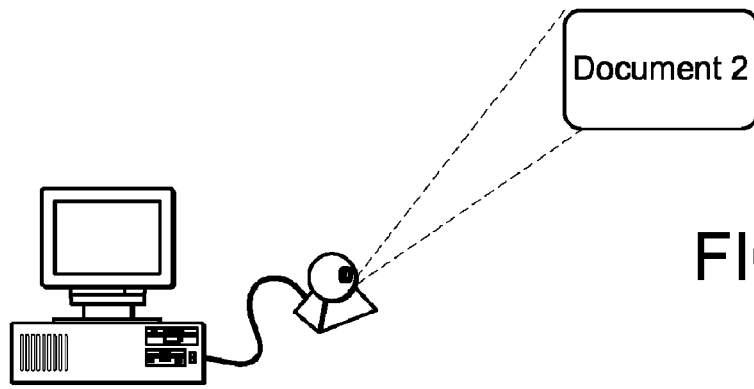
FIGS. 5*a*-5*d* are diagrams illustrating the presentation of digitally watermarked documents in a sequence to form a combination.
Figure 5B:
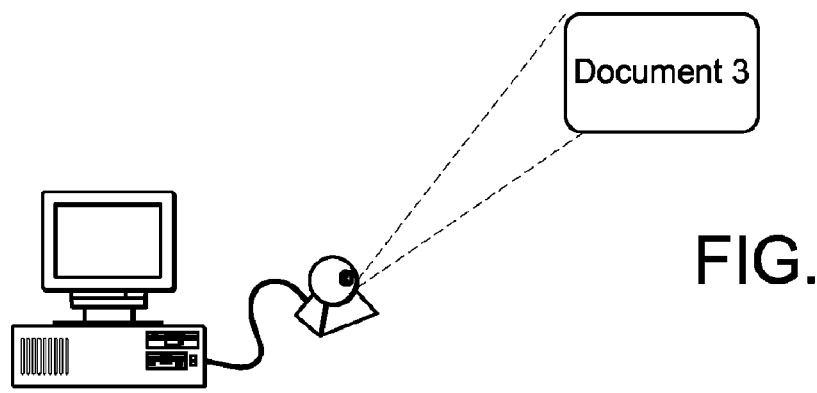
Figure 5C:
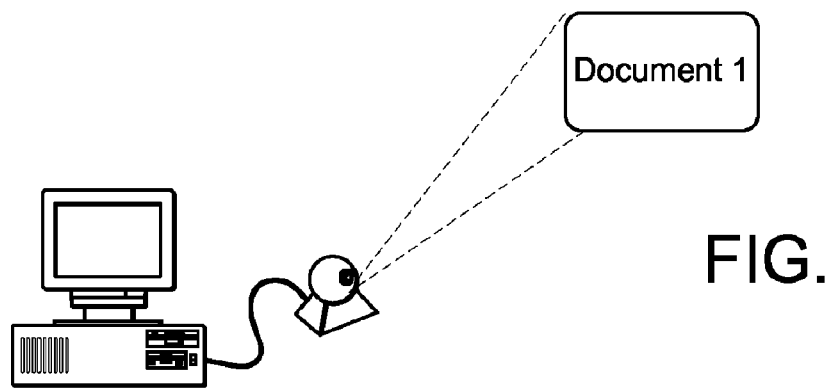
Figure 5D:
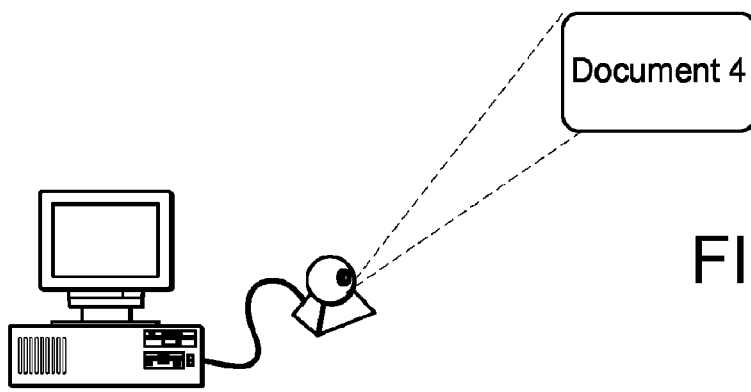

In a second example of this implementation, and with reference to FIG. 4, an employee provides a plurality of biometric samples, such as at the start of her employment. The biometric samples (or reduced bit representations of the samples) are stored in a database 40, e.g., according to employee. The employee receives a steganographically encoded document. The steganographic encoding includes a payload 42—preferably including at least two data fields 42a and 42b (or two types of data). One field 42a includes an identifier that is associated with the employee (e.g., employee number, etc.). The identifier can be used as an index to interrogate the database 40, e.g., to locate a record associated with that particular employee (e.g., one of Employees A-Z). The second field preferably includes a type of biometric data to sample or test. Once a particular employee is identified, the second field can be used to narrow the list of the many stored biometric samples (e.g., one of the biometric samples a-z). (Instead of separate fields, the identifier and biometric type fields can be concatenated as one data string). The employee presents her steganographically encoded document, which is decoded to retrieve the identifier and biometric type. The biometric type is used to determine which type of biometric information should be sampled. And the identifier (usually in conjunction with the biometric type) is used to index database 40 to access an appropriately corresponding stored biometric sample. The stored and fresh biometric samples are compared to determine identity or to determine whether to allow access. Of course, the "type" field can change each time a document is reissued, such as in the document 12 and document 12' implementation disclosed above. Thus, an employee preferably does not know which type of biometric information will be sampled on any given day.

Watermark-based Combination Lock

In parent application Ser. No. 10/275,197 and PCT/US01/14014 we disclose a digital watermark-based combination lock. The combination lock responds to a digitally watermarked card positioned at various angles or orientations. A document orientation is analogous to a lock "tumble." The card is positioned in a correct sequence of tumbles to unlock the watermark-based combination lock.

An alternative to the above-described inventive combination lock requires a user to present a plurality of cards in a proper sequence (or combination) to unlock a computer system or secure area. For example, in FIGS. 5a-5d, a user must present four digitally watermarked documents in a proper sequence (e.g., first present document number 2, then 3, then 1 and then 4). The documents are distinguished through a digital watermark embedded therein. In one implementation, each watermark includes a unique payload. The access system decodes each payload as the documents are presented in sequence. The system checks with a data record to ensure that the payloads (or documents) are presented in a correct or predetermined order. Or the payloads can include information to signal which document the system should expect next. Still further, a first digital watermark (e.g., card 2) includes a key to decode (or decrypt) a next digital watermark (e.g., card 3), and so on; the lock opens if each watermark is successfully decoded. Or the unique payload from all cards, when combined, together comprises access information to open the lock. The appropriate combination (e.g., sequence of cards) can be unique per employee or system lock. For example, a digital watermark payload may include the employee's number. This number is used to interrogate a data record to retrieve a corresponding valid combination. Or the employee keys in (or otherwise enters) her employee number to retrieve the appropriate data record.

In one implementation, a combination comprises a predetermined sequence of cards positioned at differing angles and/or scales. For example, a combination may include a first card having a first identifier and being positioned at a first angle or orientation, and a second card having a second identifier and being positioned at a second angle or orientation. A card's orientation is readily discernable by a digital watermark orientation component, e.g., as disclosed in parent application Ser. No. 10/275,197 and PCT/US01/14014. In some cases the first card corresponds to a first side of an identification document, and the second card corresponds to a second side of the same identification document.

In another implementation, a user must perform the combination in a given amount of time. This restriction helps to prevent a would-be-thief from arbitrarily or systematically presenting different combinations, in hopes of stumbling onto the right combination. Alternatively, a predetermined number of consecutive wrongly entered combinations freezes the account or lock. (For example, after two wrong combination attempts, the lock is frozen and must be reset by a system administrator or via a predetermined procedure, such as with a password/PIN.).

In still another implementation, each combination lock card includes both a robust and fragile digital watermark. Then if someone tries to crack the system by scanning and printing the watermarked cards, the fragile mark predictably degrades or is otherwise lost. The watermark detection software (and/or access software) allows access when the cards are shown in the proper order of presentation AND they each include both the robust and fragile mark. (In a related implementation, only one or a few of the combination cards include a fragile watermark. Or at least one of the combination cards includes a fragile watermark that converts to a robust watermark upon scanning and printing.). Various fragile watermarking techniques can be found, e.g., in assignee's U.S. patent application Ser. Nos. 09/234,780, 09/433,104 (U.S. Pat. No. 6,636,615), 09/498,223 (U.S. Pat. No. 6,574,350), 09/562,516, 09/567,405, 09/625,577 (U.S. Pat. No. 6,788, 800), 09/630,243 (U.S. Pat. No. 6,735,324), 09/645,779 (U.S. Pat. No. 6,714,683), 09/689,226 (U.S. Pat. No. 6,694,041), 09/689,289, 09/689,293 (U.S. Pat. No. 6,683,966), and 09/898,901 (U.S. Pat. No. 6,721,440), and in PCT Patent Application No. PCT/US02/20832 (published as WO 03/005291). Each of these patent documents is herein incorporated by reference.

Unlocking a Screen Saver or Application with a Digital Watermark

A specific example of our inventive techniques is now described in relation to a system and method for using a digital watermark embedded in a document to unlock a computer workstation screensaver or sleep mode. With reference to FIG. 1, in this implementation computer 16 includes logon and screensaver computer software instructions stored in memory 20 for execution on CPU 18. (For example, computer 16 includes Microsoft Windows 2000, XP, NT, etc., which has these features.).

In some Windows versions, a user must toggle Ctrl-Alt-Del before she can log on. This is a security feature to prevent password capturing, e.g., by a Trojan Horse program that mimics the logon screen. By hitting the so-called secure attention sequence Ctrl-Alt-Del, control and subsequent keyboard input is passed to the system's WINLOGON process. A user logon box is typically presented at this point to prompt the user to enter her username and password. Windows can be also configured to activate a screen saver after a predetermined period of non-use (e.g., 1-5 minutes, etc.), which is unlocked via a password.

Our improvement becomes evident at initial logon and/or once a screensaver is activated. Take the screensaver case. To access the conventional username/password box, a user first must present a digitally watermarked document for analysis instead of typing Ctrl-Alt-Del. In one implementation, the user shows the digitally watermarked document to an image sensor to activate the username/password box. The image sensor communicates captured image data to a watermark detector. If appropriate access information is encoded with the watermark, the username/password box appears. (In other implementations, a username/password box is skipped in lieu of the access information.). In another implementation, a keystroke (or mouse movement) activates a graphical user interface (GUI). The GUI preferably prompts the user to present her digitally watermarked document. If the watermark is successfully decoded the user is permitted to type in her password. The username/password box is activated only after the user presents the anticipated digitally watermarked document (e.g., including a payload with appropriate access information). Of course, the system can be configured to respond variously if a user presents a digitally watermarked document including a payload that does not match or active the screen saver. For example, the system can freeze—requiring a system administrator to unlock the system. Or the user can be prompted to present an anticipated digitally watermarked document.

From a system level, we can augment the Windows login with our digital watermark detection requirements. For example, we can modify or replace the Windows GINA file (e.g., "msgina.dll") to improve the logon process. (It will be appreciated that GINA stands for Graphical Identification aNd Authorization and describes an interface for the validation of logon credentials.). Our modified GINA then initiates (or cooperates with) watermark detection to facilitate access information authentication. Input device 14 captures an image of a digitally watermarked document. A watermark detector analyses the captured image data to detect a digital watermark. A watermark payload or message is decoded once the digital watermark is detected. The payload preferably includes a code or access information to unlock the logon or screensaver. The screensaver is deactivated if the code matches or otherwise provides the predetermined key. Otherwise, the user is denied access to the system via the locked screen saver. The user is preferably unable to exit the screensaver or logon process by any method (e.g., Ctrl-Alt-Del) other than using the anticipated watermark and/or the correct password.

After successfully entering in the proper password for that access information and/or that workstation, the screensaver will deactivate and return the user to the desktop.

In another implementation, the digitally watermarked document provides a necessary password/PIN without further user input.

In yet another implementation, the digital watermark payload carries an encryption key, which is used to decrypt the computer 16's memory or computer files stored in memory.

Now consider some extensions of our inventive techniques. A document includes a digital watermark having a payload. The payload corresponds to user age group or access permission. The digitally watermarked card is presented to a screen saver, not only to unlock the screen saver, but also to set appropriate computer settings. For example, consider an implementation where the FIG. 1 system resides in a public library. The library wishes to restrict young computer users from accessing pornographic or other mature material. A young user checks in at the library front desk to obtain a digitally watermarked computer access card—which reflect the age group of the young user. The user shows the card to input device 14 to deactivate the screen saver. The digital watermark carries an age indicator that is used by computer system 16 to select an appropriate computer filter (e.g., a NetNanny® age-based restriction) or to restrict certain materials.

CONCLUDING REMARKS

The foregoing are just exemplary implementations of security systems. It will be recognized that there are a great number of variations on these basic themes. The foregoing illustrates but a few applications of the detailed technology. There are many others.

Entry of a user's PIN code, or other identity check, may be desirable in certain contexts, e.g., to guard against granting access to a person who has found or stolen someone else's card. Security is further enhanced when a user possesses both i) a physical document, and ii) corresponding verification data (e.g., password, PIN, retinal scan, voice recognition, biometric verification data, etc). To illustrate, in order to gain system or network access (or to login), a user must demonstrate physical possession of document. A compliant reader reads and extracts embedded data from the document. The embedded data is used to index or otherwise identify corresponding verification data. The corresponding verification data is preferably predetermined and stored for comparison. The user is prompted to provide the verification data (e.g., to provide a PIN, yield to a fingerprint or retinal scan, etc.). (The user may be prompted to provide such verification data prior to, or after, presentment of the document). System access is granted only when the provided verification data correctly corresponds with the predetermined verification data. This multi-step security (e.g., physical possession and verification data) is valuable in many environments, including authentication to a network, access to a software application, verification of identity, verification of permissions, login security, restricted access management, etc.

To provide a comprehensive disclosure without unduly lengthening this specification, the above-mentioned patent documents are incorporated herein by reference.

Having described and illustrated the principles of the invention with reference to illustrative embodiments, it should be recognized that the invention is not so limited. The particular combinations of elements and features in the above-detailed embodiments are exemplary only; the interchanging and substitution of these teachings with other teachings in this and the incorporated-by-reference patent/applications are also contemplated. For example, the number of documents comprising a combination lock (e.g., 4) can be varied without departing from the scope of the present invention.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method comprising:
   decoding, using a processor, machine-readable information encoded in each of a plurality of physical objects, wherein each instance of machine-readable information includes identifying information;
   determining, using the processor, an order in which the encoded physical objects are presented for evaluation via the identifying information; and
   comparing, using the processor, the order to a predetermined sequence to determine whether to allow access to a computerized system.

2. The method of claim 1, wherein access is granted to the computerized system when the order and the predetermined sequence coincide in an expected manner.

3. The method of claim 2, further comprising:
   determining an orientation of at least one physical object utilizing at least some orientation information provided in encoded information; and
   comparing the orientation information to a predetermined orientation to determine whether to allow access.

4. The method of claim 2, wherein the computerized system is remotely located relative to the processor.

5. The method of claim 3, wherein the computerized system is remotely located relative to the processor.

6. A non-transitory computer-readable medium, having instructions stored thereon, the instructions comprising:
   instructions to decode machine-readable information encoded in each of a plurality of physical objects, wherein each instance of machine-readable information includes identifying information;
   instructions to determine an order in which the encoded physical objects are presented for evaluation via the identifying information; and
   instructions to compare the order to a predetermined sequence to determine whether to allow access to a remotely located computerized system.

7. The non-transitory computer-readable medium of claim 6, wherein the computerized system is remotely located relative to the non-transitory computer-readable medium.

8. The method of claim 1, wherein the machine-readable information encoded in each of the plurality of physical objects comprises digital watermarking.

9. An apparatus comprising:
   an image or video sensor for capturing image or video data;
   a processor configured to:
      decode machine-readable information encoded in captured image or video data representing a plurality of physical objects, wherein each instance of machine-readable information includes identifying information;
      determine an order in which the physical objects are presented to the image or video sensor for evaluation via the identifying information; and
      compare the order to a predetermined sequence to determine whether to allow access to a computerized system.

10. A cell phone comprising the apparatus of claim 9.

11. The apparatus of claim 9, wherein access is granted to the computerized system when the order and the predetermined sequence coincide in an expected manner.

12. The apparatus of claim 9, wherein the processor is further configured to:
   determine an orientation of at least one physical object utilizing at least some orientation information provided in encoded information; and
   compare the orientation information to a predetermined orientation to determine whether to allow access.

13. The method of claim 1, wherein the computerized system is remotely located relative to the processor.

14. The apparatus of claim 9, wherein the computerized system is remotely located relative to the processor.

15. The cell phone of claim 10, wherein the computerized system is remotely located relative to the cell phone.

16. The apparatus of claim 11, wherein the computerized system is remotely located relative to the processor.

17. The apparatus of claim 12, wherein the computerized system is remotely located relative to the processor.

18. The apparatus of claim 9, wherein the machine-readable information encoded in the captured image or video data comprises digital watermarking.

* * * * *

UNITED STATES PATENT AND TRADEMARK OFFICE
CERTIFICATE OF CORRECTION

PATENT NO. : 8,316,239 B2  
APPLICATION NO. : 12/401394  
DATED : November 20, 2012  
INVENTOR(S) : McKinley et al.

Page 1 of 1

It is certified that error appears in the above-identified patent and that said Letters Patent is hereby corrected as shown below:

Title Page 2, in Field (56), under "FOREIGN PATENT DOCUMENTS", in Column 2, Line 8, delete "WO WO 01/84438 11/2001".

Title Page 2, in Field (56), under "FOREIGN PATENT DOCUMENTS", in Column 2, Line 10, delete "WO WO 03/005291 1/2003".

Title Page 2, in Field (56), under "OTHER PUBLICATIONS", in Column 2, Lines 12-14, delete "Kawaguchi et al., .............. 1998, pp. 464-473.".

Title Page 3, in Field (56), under "OTHER PUBLICATIONS", in Column 1, Line 3, delete "vol., 73," and insert -- vol. 73, --, therefor.

In Column 2, Line 64, delete "etc., etc." and insert -- etc. --, therefor.

In Column 3, Line 31, delete "etc-" and insert -- etc.,- --, therefor.

In Column 4, Line 7, delete "etc., etc." and insert -- etc. --, therefor.

In Column 9, Line 41, in Claim 1, delete "a computerized" and insert -- a remotely located computerized --, therefor.

Signed and Sealed this  
Second Day of April, 2013

Teresa Stanek Rea  
*Acting Director of the United States Patent and Trademark Office*